Nov. 2, 1954   L. H. RATH   2,693,379
COUPLING CONNECTION FOR AUGER PIPE
Filed April 25, 1952

INVENTOR.
LEWIS H. RATH
BY
McMorrow, Berman & Davidson
ATTORNEYS

United States Patent Office 2,693,379
Patented Nov. 2, 1954

2,693,379
COUPLING CONNECTION FOR AUGER PIPE

Lewis H. Rath, Gainesville, Mo.

Application April 25, 1952, Serial No. 284,221

1 Claim. (Cl. 285—169)

This invention relates to drill pipe, and more particularly to an improved coupling structure for a drill pipe.

The main object of the invention is to provide a novel and improved means for coupling together the ends of two sections of drill pipe, said means being simple in construction, involving relatively few parts, and providing a great saving in time and labor in the securement together of two sections of drill pipe.

A further object of the invention is to provide an improved coupling device for connecting together the ends of a pair of drill pipe sections, the improved coupling means being inexpensive to manufacture, being easy to manipulate, being sturdy in construction, and providing a positive connection between the drill pipe sections which will not accidentally work loose but which may be readily assembled and disassembled.

Further objects and advantages of the invention will become apparent from the following description and claim, and from the accompanying drawings, wherein:

The device of the present invention provides a means of rapidly connecting together separate sections of pipe for use in drilling with a dirt auger under streets, sidewalks, drives, and the like, for the installation of water mains, gas lines, electric ducts, and telephone cables. The present practice in this type of work is to employ galvanized water pipe or black gas pipe, cut and threaded in various lengths, depending upon the size of the hole or ditch which is dug in the ground for feeding in the drill pipe, said hole or ditch being in many cases only three or four feet long. The various lengths of pipe are coupled together with conventional female tapped pipe couplings, which have to be tightened on the auger pipe with pipe wrenches, and are taken apart by the same method. With this arrangement, considerable time is required to connect and disconnect these lengths of pipe. For example, in augering under a street fifty feet wide, the auger couplings have to be connected and disconnected approximately fifty or more times, and if the augering has to be done from a ditch five feet long, for example, it would necessitate threading and unthreading these couplings two hundred to four hundred times. By the use of an improved pipe coupling as will be presently described, these operations could be performed in a considerably reduced period of time, as compared with the time required by the method of the prior art.

Figure 1:
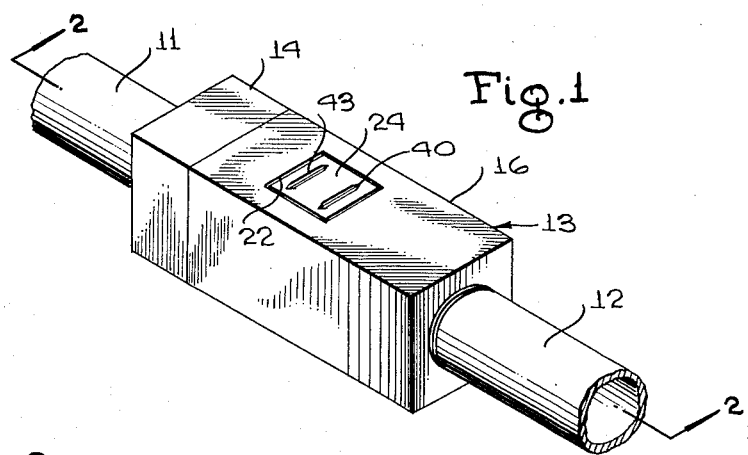
Figure 1 is a perspective view of the end portions of a pair of drill pipe sections connected together by an improved coupling device constructed in accordance with the present invention.
Figure 2:
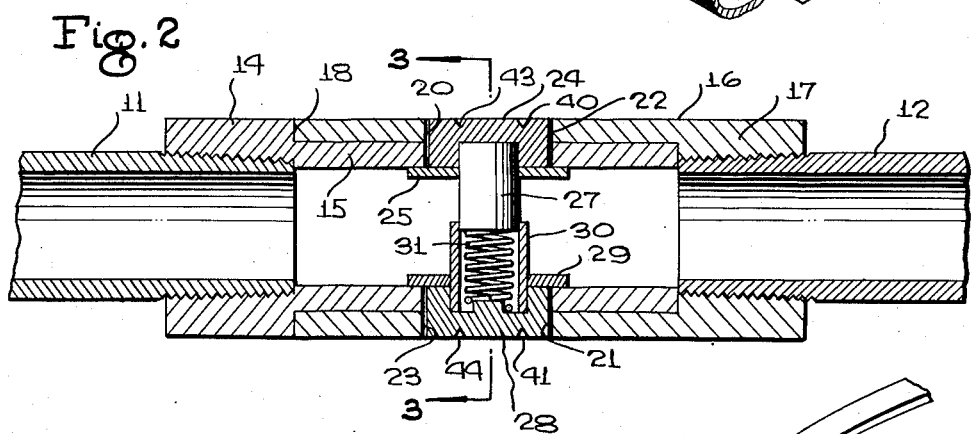
Figure 2 is an enlarged vertical cross sectional view taken on the line 2—2 of Figure 1.
Figure 3:
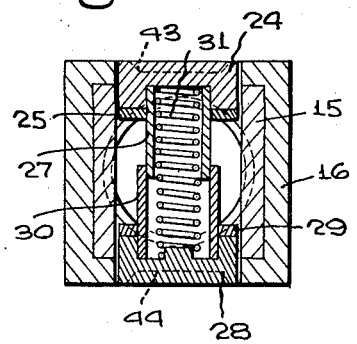
Figure 3 is a vertical transverse cross sectional view taken on the line 3—3 of Figure 2.

Referring to the drawings, 11 designates a first section of auger pipe and 12 designates a second section of pipe which is to be connected to the first section 11. Designated generally at 13 is an improved coupling means according to the present invention. Said coupling means 13 comprises a first rectangular sleeve member 14 having a reduced main body portion 15. The rear end of the main body portion 14 is internally threaded to receive the tapered threads of the pipe section 11, as shown in Figure 2. Designated at 16 is a second rectangular sleeve member arranged to telescope over the reduced portion 15 of the first sleeve member 14, as shown in Figure 2. The end portion of the second rectangular sleeve member 16 is internally threaded to receive the tapered threads on the second pipe section 12, as shown in Figure 2. The internally threaded end portion of the second sleeve member 16 is thickened, as shown at 17, to define an abutment against which the ends of the reduced portion 15 of the first sleeve member 14 is engageable, as shown in Figure 2. Similarly, the end of the second sleeve member 16 is engageable against the abutment shoulder 18 defined between the end portion of the first sleeve member 14 and the reduced portion 15.

The top and bottom walls of the reduced portion 15 of the first sleeve member are formed with opposed rectangular apertures 20, 21 and the second rectangular sleeve member 16 is formed in its top and bottom walls with the opposed rectangular apertures 22, 23 which are registerable with the apertures 20 and 21, as shown in Figure 2. Registration of these apertures occurs when the end of reduced sleeve portion 15 is in abutment with the thickened portion 17 of the second sleeve member and when the end of the second sleeve member is in abutment with the shoulder 18, as above described.

Designated at 24 is a rectangular block which is engageable in the registering rectangular apertures 20 and 22, said block having secured thereto a plate element 25 defining a stop flange engageable against the inside surface of the reduced sleeve portion 15 to limit outward movement of the block member 24 through the registering apertures 20 and 22. Axially secured to the block 24 and extending in the sleeve portion 15 is a cylindrical shell member 27. Designated at 28 is a rectangular block member which is receivable in the registering apertures 21 and 23 and which have secured thereto a plate member 29 which is engageable with the inside surface of the reduced sleeve portion 15, opposite the plate member 25 to limit the outward extension of the block 28 through the apertures 21 and 23. Axially secured to the block 28, in the manner shown in Figure 2, is a shell member 30 which telescopically receives the shell member 27.

Designated at 31 is a coiled spring which is mounted axially inside the telescoping shell members 30 and 27 and which bears at its ends and is secured to the respective rectangular block members 24 and 28. The spring 31 biases the block members 24 and 28 outwardly away from each other and serves to lock said block members in locking positions in the registering apertures 20, 22 and 21, 23, as shown in Figure 2.

Figure 4:
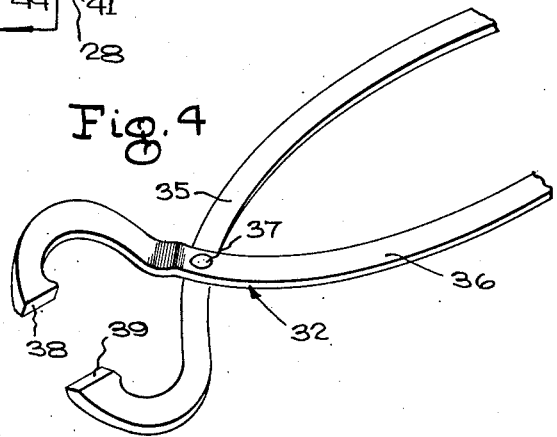
Figure 4 is a perspective view of a pair of tongs which may be employed for coupling and uncoupling the pipe sections in conjunction with the coupling device shown in Figures 1, 2 and 3.

It will be readily apparent that the sleeve elements 16 and 14 may be detached from each other by squeezing the block members 24 and 28 inwardly a sufficient distance to allow the sleeve member 16 to be separated from the reduced sleeve portion 15 of the first sleeve member 14. This may be accomplished by the use of a pair of tongs, such as shown at 32 in Figure 4, said tongs comprising the pivoted arms 35 and 36, pivotally connected at 37, and having the respective opposing, tapered clamping ends 38 and 39. The block members 24 and 28 are formed with the respective transversely extending grooves 40 and 41 in which the ends 38 and 39 of the tongs 32 are engaged when the sleeve members of the coupling device are to be disengaged from each other. From Figure 2 it will be seen that the grooves 40 and 41 are located adjacent the right margin of the block members 24 and 28, whereby the sleeve member 16 may be slid to the right relative to the reduced sleeve portion 15 over a major portion of the block members 24 and 28, when said block members are squeezed inwardly by the tongs 32. Similarly, the block members 24 and 28 are formed with additional grooves 43 and 44 adjacent their left margins which are engaged by the tapered ends 38 and 39 of the tongs 32 when the sleeve element 16 is to be coupled to the reduced sleeve portion 15.

While a specific embodiment of an improved drill pipe coupling device has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

A drill pipe coupling comprising a first sleeve member of rectangular cross section having internal threads at one end engageable on the externally threaded end of a first drill pipe section, a second sleeve member of rectangular cross section telescopically engageable over the first sleeve member and having internal threads at one end engageable on the externally threaded end of a second drill pipe section, said sleeve members being formed in their opposite walls with respective opposed registrable square apertures, and a compressible resilient locking member disposed in said first sleeve member and having square ends slidably engageable through said apertures to secure the sleeve members in telescoping relationship, said square ends having substantially flat outer faces which are parallel to each other, said last named ends being provided with inner stop flanges, spring means biasing said last named ends away from each other, the flanges on said last named ends engaging the inside surface of the first sleeve member around the apertures therein to limit extension of said last named ends to positions wherein said flat outer faces are substantially flush with the outer surface of said second sleeve member, said spring means comprising a coil spring secured at its opposite ends to the respective square ends, and telescoping tubes secured to said square ends and housing said coil spring, and an external shoulder on said first sleeve member engageable by the end edge of said second sleeve member when said square apertures are in registry, said flat outer faces being formed with transversely extending grooves engageable by a squeezing tool for at times moving the square ends inwardly.

References Cited in the file of this patent

UNITED STATES PATENTS

| Number | Name | Date |
| --- | --- | --- |
| 526,448 | Karschner | Sept. 25, 1894 |
| 859,233 | Lane | July 9, 1907 |
| 1,189,802 | Eckert | July 4, 1916 |
| 2,146,252 | Ell | Feb. 7, 1939 |

FOREIGN PATENTS

| Number | Country | Date |
| --- | --- | --- |
| 658,490 | Great Britain | Oct. 10, 1951 |